UNITED STATES PATENT OFFICE.

WILLIAM A. KONEMAN, OF CHICAGO, ILLINOIS.

PROCESS OF EXTRACTING PRECIOUS METALS FROM THEIR ORES.

SPECIFICATION forming part of Letters Patent No. 578,340, dated March 9, 1897.

Application filed October 26, 1895. Serial No. 567,008. (No specimens.)

*To all whom it may concern:*

Be it known that I, WILLIAM A. KONEMAN, a citizen of the United States, residing at Chicago, in the county of Cook and State of Illinois, have invented a new and useful Improvement in the Process of Extracting Precious Metals from Ores, of which the following is a specification.

My invention relates to an improvement in the art of extracting gold and silver from ores containing them by the use of cyanogen-containing solvents; and it consists, more particularly, in the method I have discovered for utilizing such solvents to the best advantage.

In the absence, up to the present time, of any sufficiently economical method of producing cyanogen in the gaseous form it is common to produce it for use in extracting precious metals from their ores from potassium cyanid almost to the exclusion of all other substances from which it might be obtained. As hitherto employed for the purpose referred to, the manner of its use has been twofold, namely, in the so-called "agitation" treatment and in the more commonly employed "percolation" treatment.

According to the first-named treatment the ore in pulverized condition is mixed with a potassium-cyanid solution in sufficient quantity to adapt the mixture to be freely agitated in a receptacle equipped with a suitable stirring or agitating apparatus, and the agitating operation is carried on in the receptacle either continuously or periodically until the separation of the precious metals from the ore is completed, when the contents of the receptacle are subjected to filtration.

The percolation treatment referred to involves subjecting the pulverized ore in a receptacle provided with a filtering-bottom to the action of a cyanid solution by causing a constant flow of the latter to percolate through the ore until all of the gold and silver which can be recovered therefrom has been extracted. Of these two methods of treatment that by agitation has been practically discontinued by reason of its expensiveness due to the quantity consumed of the cyanogen contained in the solution and which is rapidly destroyed by atmospheric oxidation, particularly when the treatment is practiced in an open vessel. The percolation treatment is much the more economical of the two in the use of cyanogen, though even by that treatment the quantity used renders the proceeding undesirably expensive, it being quite common to utilize at least three tons of the solution to treat one ton of ore, and all the solution is injuriously acted on by the atmosphere, as well as being acted on by the ore. Moreover, it is known to be a fact that the destruction of cyanogen takes place practically in the same ratio with different strengths of the cyanid solution. Thus it is found with one batch of ore treated with a solution containing, say, six pounds of potassium cyanid per ton and another treated with a solution containing, say, twenty pounds of potassium cyanid per ton that each solution loses in the same length of time practically the same percentage of cyanogen, although they both may extract the same percentage of gold and silver or either. To secure the least loss by oxidation of cyanogen, therefore, it would appear that there must be used either a small quantity of the cyanid solution or that a larger quantity of the solution must be used for a shorter period of time, because altogether independently of the ore action there is great loss which is related in its ratio directly to the factors, quantity, strength, and time.

The foregoing exposition of the present state of the art and conditions therein, so far as the same are known to me, is thought to be necessary for a due appreciation, by comparison therewith, of my improvement hereinafter described.

I have discovered that the simple wetting down of pulverized ore containing gold or silver, or both, with a cyanogen-containing solution to reduce it to the condition of mud or a pulp is fully as effective in producing the extraction of the precious metals from the ore as either of the two agitation and percolation treatments with the larger quantities of the solution required for either. I have also discovered that by subjecting the ore while in a quiescent state to the action of a cyanid solution without motion the gold and silver contained in the ore will be dissolved as effectively as when the solution is in motion without the disadvantage of undue loss by oxidation of cyanogen; and I have further discovered that by following this quiescent treatment with agitation the yield by extraction of the precious metal or metals from the ore is greatly increased over any method now in use, so far as I am aware.

To practice my improved process in all its details, I proceed as follows: The pulverized ore is mixed in a suitable receptacle or mixing-floor with a solution containing cyanogen, such as potassium cyanid, and which may advantageously be reinforced by the addition of a relatively small quantity of chlorin, bromin, or analogous reagent to the consistency of mud or pulp, in which condition the mixture is allowed to remain in a state of rest for a period of time prolonged according to the nature of the ore, though in no case is it necessary to continue this macerating treatment for a period of time greater than about one-half the time the same ore would require to be subjected to the percolating treatment referred to. The proportionate quantity of solution to the ore is required to be only so much solution as the ore will absorb and a little more to allow for loss by evaporation and chemical action. Thus thirty to forty per cent. in weight of ore of the solution suffices. From ten to twenty-four hours usually suffices for raw ore which is free from sulfids. When this macerating treatment is finished, the mass of material is subjected to agitation, preferably in another receptacle, which should be equipped with any well-known or suitable agitating or stirring apparatus, such as a barrel of suitable capacity. During the agitation of the mass I thin it down either with water or with a weak cyanid solution, and the agitation is continued for a period of time suitable to the nature of the particular ore undergoing treatment, though such period need rarely exceed about six hours. When the material has been thus sufficiently agitated, it is subjected to treatment, as by filtration, for separating the solution containing the precious metal or metals, and this filtrate is then subjected to treatment by any well-known or suitable method for separating the precious metal from the solution, as by precipitation.

The increased yield which I obtain by my improved treatment is attributable to the ready dissolution by the solution of the exposed atoms of precious metal, and when the precious metal is contained in pyrites or is accompanied with volatile matter, such as arsenic, antimony, or tellurium, the solution penetrates these compounds as long as it can find gold or silver, though there eventually results a spongy condition of the particles of ore, and the spongy cells become clogged with chemical slimes and salts formed by union of the potassium cyanid with the ingredients of the ore. These slimes and salts when formed require to be removed in order to permit extraction of the last vestiges of the precious metals, and this is effected by the agitation step in my improved treatment.

While the cyanid treatment as hitherto practiced is found to produce a maximum yield of about eighty-five per cent. of the precious metals contained in the ore treated, by my improvement ninety-five per cent. may readily be extracted with comparatively little loss by consumption of cyanid. The economical value of my improvement, therefore, lies in the comparatively small quantity of cyanid consumed, thus materially reducing the cost of chemicals and in the greater yield of precious metals attained.

I am aware that various processes are now employed for the use of cyanogen-containing solutions in dissolving the precious metals out of ore, so that I do not claim, broadly, as my invention the use of such solutions for this purpose, and especially not when they are of a specifically limited strength. The gist of my improvement relates, first, to the quiescent feature of the treatment, and, secondly to the treatment (rendered possible by merely moistening the ore) with comparatively little of the cyanid, even when the ore is moistened with solutions of far greater strength or concentration than has hitherto been used for the purpose, and my process involves the use of some suitable reagent with the solution containing cyanogen.

What I claim as new, and desire to secure by Letters Patent, is—

The process of extracting precious metal from the ore containing it, which consists in wetting the ore, in a pulverized condition, with just sufficient cyanogen-containing solution to moisten the ore and reduce the mass to the condition of mud, maintaining the saturated ore in a quiescent state for a prolonged period of time, then diluting the mass and subjecting it to agitation for a suitable period of time, separating the resultant solution from the ore by filtration and finally precipitating the precious metal from said solution, substantially as and for the purpose set forth.

WILLIAM A. KONEMAN.

In presence of—
  M. J. FROST,
  J. H. LEE.